(12) United States Patent
Rathay et al.

(10) Patent No.: US 11,407,488 B2
(45) Date of Patent: Aug. 9, 2022

(54) SYSTEM AND METHOD FOR COOLING A LEADING EDGE OF A HIGH SPEED VEHICLE

(71) Applicant: General Electric Company, Schenectady, NY (US)

(72) Inventors: Nicholas William Rathay, Rock City Falls, NY (US); Corey Bourassa, Mechanicville, NY (US); Douglas Carl Hofer, Clifton Park, NY (US); Gregory Alexander Natsui, Schenectady, NY (US); Brian Magann Rush, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 51 days.

(21) Appl. No.: 17/120,674

(22) Filed: Dec. 14, 2020

(65) Prior Publication Data

US 2022/0185446 A1    Jun. 16, 2022

(51) Int. Cl.
*B64C 1/38* (2006.01)
*B64C 3/36* (2006.01)
*B64C 30/00* (2006.01)

(52) U.S. Cl.
CPC ............... *B64C 1/38* (2013.01); *B64C 30/00* (2013.01)

(58) Field of Classification Search
CPC ............... B64C 1/38; B64C 3/36; B64G 1/58
See application file for complete search history.

(56) References Cited

U.S. PATENT DOCUMENTS

| 2,451,692 | A | 10/1948 | Pugh |
| 3,064,317 | A | 11/1962 | Dobson |
| 3,119,333 | A | 1/1964 | Loughran |
| 3,151,712 | A | 10/1964 | Jackson |
| 3,321,154 | A | 5/1967 | Downs |

(Continued)

FOREIGN PATENT DOCUMENTS

| CN | 1201704 A | 12/1998 |
| CN | 104776740 A | 7/2015 |

(Continued)

OTHER PUBLICATIONS

Air pollution Control Technology Fact Sheet, Wet Electrostatic Precipitator (ESP), Wire-Pipe Type, EPA-452/F-03-029, Oct. 23, 2018, pp. 1-4. Retrieved from Internet URL: https://www3.epa.gov/ttnchie1/mkb/documents/fwespwpi.pdf.

(Continued)

*Primary Examiner* — Brian M O'Hara
(74) *Attorney, Agent, or Firm* — Dority & Manning, P.A.

(57) ABSTRACT

A hypersonic aircraft includes one or more leading edge assemblies that are designed to manage thermal loads experienced at the leading edges during high speed or hypersonic operation. Specifically, the leading edge assemblies may include an outer wall tapered to a leading edge or stagnation point. The outer wall may define a vapor chamber and a capillary structure within the vapor chamber for circulating a working fluid in either liquid or vapor form to cool the leading edge. In addition, a dual-modal cooling structure can enhance heat transfer from the outer wall at the leading edge to the outer wall within the condenser section of the vapor chamber.

19 Claims, 7 Drawing Sheets

(56) References Cited

U.S. PATENT DOCUMENTS

| | | | |
|---|---|---|---|
| 3,656,317 A | 4/1972 | Gray | |
| 3,731,893 A | 5/1973 | Stalmach, Jr. | |
| 3,777,975 A | 12/1973 | Kofink | |
| 3,785,591 A | 1/1974 | Stalmach, Jr. | |
| 3,808,833 A | 5/1974 | Allen et al. | |
| 3,883,096 A | 5/1975 | Osofsky | |
| 3,908,936 A | 9/1975 | Durran | |
| 4,014,485 A | 3/1977 | Kinnaird et al. | |
| 4,203,489 A | 5/1980 | Swiadek | |
| 4,344,591 A | 8/1982 | Jackson | |
| 4,671,348 A | 6/1987 | Bauer | |
| 4,700,773 A | 10/1987 | Kehrer | |
| 4,771,365 A | 9/1988 | Chichocki et al. | |
| 4,915,164 A | 4/1990 | Harper | |
| 4,923,146 A | 5/1990 | Anthony | |
| 4,924,228 A | 5/1990 | Novak et al. | |
| 4,966,229 A * | 10/1990 | Senterfitt | F28D 15/0233 62/7 |
| 4,991,797 A | 2/1991 | Miller et al. | |
| 5,149,018 A | 9/1992 | Clark | |
| 5,174,524 A | 12/1992 | Amneus, III | |
| 5,227,957 A | 7/1993 | Deters | |
| 5,257,757 A * | 11/1993 | Paul | B64G 1/58 244/159.1 |
| 5,283,715 A | 2/1994 | Carlsten et al. | |
| 5,291,830 A | 3/1994 | Zwan | |
| 5,299,762 A | 4/1994 | Kosson et al. | |
| 5,330,124 A | 7/1994 | LeTouche | |
| 5,343,632 A | 9/1994 | Dinh | |
| 5,351,917 A | 10/1994 | Bulman | |
| 5,439,351 A | 8/1995 | Artt | |
| 5,452,866 A | 9/1995 | Bulman | |
| 5,579,830 A | 12/1996 | Giammaruti | |
| 5,647,429 A | 7/1997 | Oktay et al. | |
| 5,690,473 A | 11/1997 | Kercher | |
| 5,720,339 A | 2/1998 | Glass et al. | |
| 5,761,909 A | 6/1998 | Hughes et al. | |
| 5,899,265 A | 5/1999 | Schneider et al. | |
| 5,975,841 A | 11/1999 | Lindemuth et al. | |
| 6,164,061 A | 12/2000 | Chevalier et al. | |
| 6,233,150 B1 | 5/2001 | Lin et al. | |
| 6,260,613 B1 | 7/2001 | Pollard | |
| 6,301,332 B1 | 10/2001 | Rogers et al. | |
| 6,359,218 B1 | 3/2002 | Koch et al. | |
| 6,360,813 B1 | 3/2002 | Katoh et al. | |
| 6,367,740 B1 | 4/2002 | Johnson et al. | |
| 6,375,425 B1 | 4/2002 | Lee et al. | |
| 6,378,605 B1 | 4/2002 | Kutscher et al. | |
| 6,392,883 B1 | 5/2002 | Ali | |
| 6,430,931 B1 | 8/2002 | Homer | |
| 6,478,257 B1 | 11/2002 | Oh et al. | |
| 6,511,762 B1 | 1/2003 | Lee et al. | |
| 6,599,568 B2 | 7/2003 | Lee et al. | |
| 6,624,349 B1 | 9/2003 | Bass | |
| 6,631,755 B1 | 10/2003 | Kung et al. | |
| 6,678,159 B1 | 1/2004 | Barcley | |
| 6,889,755 B2 | 5/2005 | Zuo et al. | |
| 6,983,790 B2 | 1/2006 | Ippoushi et al. | |
| 6,994,152 B2 | 2/2006 | Rosenfeld et al. | |
| 7,002,247 B2 | 2/2006 | Mok et al. | |
| 7,007,741 B2 | 3/2006 | Sen et al. | |
| 7,032,654 B2 | 4/2006 | Wand et al. | |
| 7,086,247 B2 | 8/2006 | Campbell et al. | |
| 7,128,532 B2 | 10/2006 | Petervary et al. | |
| 7,189,064 B2 | 3/2007 | Helder et al. | |
| 7,232,093 B2 | 6/2007 | Behrens et al. | |
| 7,256,992 B1 | 8/2007 | Stewart et al. | |
| 7,281,688 B1 | 10/2007 | Cox et al. | |
| 7,369,410 B2 | 5/2008 | Chen et al. | |
| 7,377,098 B2 | 5/2008 | Walker et al. | |
| 7,473,995 B2 | 1/2009 | Rumer et al. | |
| 7,594,537 B2 | 9/2009 | Hou et al. | |
| 7,686,248 B2 | 3/2010 | Weber et al. | |
| 7,704,565 B2 | 4/2010 | Slaughter | |
| 7,768,783 B1 | 8/2010 | Kajiya et al. | |
| 7,859,844 B2 | 12/2010 | Nguyen et al. | |
| 7,871,578 B2 | 1/2011 | Schmidt | |
| 7,900,438 B2 | 3/2011 | Venkataramani et al. | |
| 7,907,409 B2 | 3/2011 | Wyatt et al. | |
| 7,928,562 B2 | 4/2011 | Arvelo et al. | |
| 7,942,025 B1 | 5/2011 | Musone | |
| 8,047,269 B2 | 11/2011 | Kang et al. | |
| 8,109,324 B2 | 2/2012 | Farid et al. | |
| 8,176,972 B2 | 5/2012 | Mok | |
| 8,323,122 B2 | 12/2012 | Soracco et al. | |
| 8,424,203 B2 | 4/2013 | dos Santos e Lucato | |
| 8,464,535 B2 | 6/2013 | White et al. | |
| 8,466,486 B2 | 6/2013 | Yuan | |
| 8,475,112 B1 | 7/2013 | Ryznic et al. | |
| 8,549,749 B2 | 10/2013 | Zimbeck et al. | |
| 8,610,761 B2 | 12/2013 | Haisty et al. | |
| 8,616,834 B2 | 12/2013 | Knight, III et al. | |
| 8,656,722 B2 | 2/2014 | Norris et al. | |
| 8,678,316 B2 | 3/2014 | Rawlings et al. | |
| 8,684,310 B2 | 4/2014 | Rawlings et al. | |
| 8,844,877 B1 | 9/2014 | Driemeyer et al. | |
| 8,934,235 B2 | 1/2015 | Rubenstein et al. | |
| 8,937,384 B2 | 1/2015 | Bao et al. | |
| 8,960,601 B2 | 2/2015 | Willdig et al. | |
| 9,193,457 B2 | 11/2015 | Janeke | |
| 9,284,231 B2 | 3/2016 | Minnear et al. | |
| 9,475,593 B2 | 10/2016 | Pinney et al. | |
| 9,476,651 B2 | 10/2016 | Thiagrarajan et al. | |
| 9,493,228 B2 | 11/2016 | Herzberg et al. | |
| 9,516,791 B2 | 12/2016 | Chester et al. | |
| 9,913,411 B2 | 3/2018 | De Bock et al. | |
| D818,093 S | 5/2018 | Emo et al. | |
| 9,974,157 B2 | 5/2018 | de Bock et al. | |
| 10,173,780 B2 | 1/2019 | Mackin et al. | |
| 10,209,009 B2 | 2/2019 | Gerstler et al. | |
| 10,356,945 B2 | 7/2019 | Rush et al. | |
| 10,386,127 B2 | 8/2019 | Rush et al. | |
| 2002/0021556 A1 | 2/2002 | Dibene et al. | |
| 2002/0144811 A1 | 10/2002 | Chou et al. | |
| 2003/0043547 A1 | 3/2003 | Nealis et al. | |
| 2004/0011503 A1 | 1/2004 | Kung et al. | |
| 2004/0129032 A1 | 7/2004 | Severns et al. | |
| 2005/0103473 A1 | 5/2005 | Todd et al. | |
| 2005/0207120 A1 | 9/2005 | Tseng et al. | |
| 2006/0060328 A1 | 3/2006 | Ewes et al. | |
| 2006/0140346 A1 | 6/2006 | McCarthy | |
| 2006/0145020 A1 | 7/2006 | Buehler | |
| 2007/0012429 A1 | 1/2007 | Siu | |
| 2007/0017659 A1 | 1/2007 | Bmnschwiler et al. | |
| 2007/0151708 A1 | 7/2007 | Touzov | |
| 2007/0247813 A1 | 10/2007 | Colbert et al. | |
| 2008/0149299 A1 | 6/2008 | Slaughter | |
| 2008/0170368 A1 | 7/2008 | Chen et al. | |
| 2008/0235977 A1 | 10/2008 | Kuwabara | |
| 2009/0040726 A1 | 2/2009 | Hoffman et al. | |
| 2009/0090109 A1 | 4/2009 | Mills et al. | |
| 2009/0151900 A1 | 6/2009 | Huang | |
| 2009/0244830 A1 | 10/2009 | Wyatt et al. | |
| 2010/0051227 A1 | 3/2010 | Anbudurai | |
| 2010/0065256 A1 | 3/2010 | Wilcoxon et al. | |
| 2010/0109137 A1 | 5/2010 | Sasaki et al. | |
| 2010/0170101 A1 | 7/2010 | Taniguchi et al. | |
| 2010/0200199 A1 | 8/2010 | Habib et al. | |
| 2010/0212656 A1 | 8/2010 | Qiu et al. | |
| 2010/0320187 A1 | 12/2010 | Griffin et al. | |
| 2011/0016886 A1 | 1/2011 | Ghoshal et al. | |
| 2011/0168159 A1 | 7/2011 | Lataperez et al. | |
| 2011/0209864 A1 | 9/2011 | Figus et al. | |
| 2011/0232877 A1 | 9/2011 | Meyer, IV et al. | |
| 2011/0253344 A1 | 10/2011 | Kuhn et al. | |
| 2011/0259041 A1 | 10/2011 | Kuehl et al. | |
| 2011/0279969 A1 | 11/2011 | Memon | |
| 2011/0279970 A1 | 11/2011 | Guan | |
| 2012/0107662 A1 | 5/2012 | Roemmler et al. | |
| 2012/0110869 A1 | 5/2012 | Bellinger et al. | |
| 2012/0125573 A1 | 5/2012 | Rubenstein et al. | |
| 2012/0155015 A1 | 6/2012 | Govindasamy et al. | |
| 2012/0192574 A1 | 8/2012 | Ghoshal et al. | |
| 2012/0206880 A1 | 8/2012 | Andres et al. | |

(56) References Cited

U.S. PATENT DOCUMENTS

| | | |
|---|---|---|
| 2012/0227926 A1 | 9/2012 | Field et al. |
| 2012/0250259 A1 | 10/2012 | Lee et al. |
| 2012/0319410 A1 | 12/2012 | Ambrosek et al. |
| 2012/0331269 A1 | 12/2012 | Aras |
| 2013/0003307 A1 | 1/2013 | Jang |
| 2013/0008632 A1 | 1/2013 | Bmnschwiler et al. |
| 2013/0056170 A1 | 3/2013 | Klemencic |
| 2013/0077245 A1 | 3/2013 | Gradinger et al. |
| 2013/0079693 A1 | 3/2013 | Ranky et al. |
| 2013/0098417 A1 | 4/2013 | Gavillet |
| 2013/0105122 A1 | 5/2013 | Campbell et al. |
| 2013/0107455 A1 | 5/2013 | Cottet et al. |
| 2013/0170142 A1 | 7/2013 | Weaver, Jr. et al. |
| 2013/0189594 A1 | 7/2013 | Breit et al. |
| 2013/0206374 A1 | 8/2013 | Rosin et al. |
| 2014/0014493 A1 | 1/2014 | Ryan |
| 2014/0037873 A1 | 2/2014 | Cheung et al. |
| 2014/0060771 A1 | 3/2014 | Bell et al. |
| 2014/0083653 A1 | 3/2014 | Kempers et al. |
| 2014/0090808 A1 | 4/2014 | Bessho et al. |
| 2014/0102662 A1 | 4/2014 | Grama et al. |
| 2014/0104787 A1 | 4/2014 | Chainer et al. |
| 2014/0150464 A1 | 6/2014 | Bloedow et al. |
| 2014/0154539 A1 | 6/2014 | Kwok et al. |
| 2014/0158334 A1 | 6/2014 | Dellea et al. |
| 2014/0163445 A1 | 6/2014 | Pallari et al. |
| 2014/0174086 A1 | 6/2014 | Kare et al. |
| 2014/0190667 A1 | 7/2014 | McGlen et al. |
| 2014/0233174 A1 | 8/2014 | Demange |
| 2014/0251585 A1 | 9/2014 | Kusuda et al. |
| 2014/0268831 A1 | 9/2014 | Shih et al. |
| 2014/0268969 A1 | 9/2014 | Crouch et al. |
| 2014/0284020 A1 | 9/2014 | Amir et al. |
| 2014/0321998 A1 | 10/2014 | Maar et al. |
| 2014/0334104 A1 | 11/2014 | Yang et al. |
| 2014/0340845 A1 | 11/2014 | Straznicky et al. |
| 2014/0362590 A1 | 12/2014 | Chen et al. |
| 2014/0368992 A1 | 12/2014 | Strader et al. |
| 2015/0000871 A1 | 1/2015 | Farmer et al. |
| 2015/0027669 A1 | 1/2015 | Kokas et al. |
| 2015/0040888 A1 | 2/2015 | Zakhidov et al. |
| 2015/0080495 A1 | 3/2015 | Heikkila |
| 2015/0237762 A1 | 8/2015 | Holt et al. |
| 2015/0289413 A1 | 10/2015 | Rush et al. |
| 2015/0315971 A1 | 11/2015 | Reitz et al. |
| 2015/0366105 A1 | 12/2015 | Dunwoody et al. |
| 2016/0116218 A1 | 4/2016 | Shedd et al. |
| 2016/0124474 A1 | 5/2016 | So et al. |
| 2016/0202003 A1 | 7/2016 | Gerstler et al. |
| 2016/0305279 A1 | 10/2016 | Gerstler et al. |
| 2016/0319135 A1 | 11/2016 | Hecht |
| 2017/0064868 A1 | 3/2017 | Rush et al. |
| 2017/0067693 A1 | 3/2017 | Rush et al. |
| 2017/0167838 A1 | 6/2017 | Quertelet |
| 2017/0276440 A1 | 9/2017 | Kenworthy et al. |
| 2017/0363363 A1 | 12/2017 | Lassini et al. |
| 2018/0022439 A1 | 1/2018 | Stanley et al. |
| 2018/0057191 A1 | 3/2018 | Zhang et al. |
| 2018/0356794 A1 | 12/2018 | Wiedenhoefer et al. |
| 2020/0103947 A1 | 4/2020 | Rush et al. |

FOREIGN PATENT DOCUMENTS

| | | |
|---|---|---|
| CN | 104859835 | 8/2015 |
| DE | 2837802 A1 | 8/1979 |
| DE | 102011086786 B3 | 3/2013 |
| EP | 1054583 A2 | 11/2000 |
| GB | 849212 A | 9/1960 |
| GB | 2476253 A | 6/2011 |
| JP | 9-4962 | 1/1997 |
| TW | I289655 B | 11/2007 |
| WO | WO2013/097031 A2 | 7/2013 |
| WO | WO2016/057471 A1 | 4/2016 |

OTHER PUBLICATIONS

Ameli et al., A Novel Method for Manufacturing Sintered Aluminium Heat Pipes (SAHP), Applied Thermal Engineering, vol. 52, Issue 2, Apr. 15, 2013, pp. 498-504.

Arif-Uz-Zaman et al., A Novel Dehumidification Technique Using Electric Field, IEEE Transactions on Industry Applications, vol. 32, Issue 1, Jan./Feb. 1996, pp. 36-40.

Battery Prognostics--Prognosis Framework, National Aeronautics and Space Administration, May 8, 2014, pp. 1-3. Retrieved from Internet URL: https://ti.arc.nasa.gov/tech/dash/groups/pcoe/battery-prognostics/prognos- is-framework/.

Bendt, Are We Missing Energy Savings in Clothes Dryers?, ACEEE Summer Study on Energy Efficiency in Buildings, 2010, pp. 9-42 to 9-55.

Brackett et al., Topology Optimization for Additive Manufacturing, Wolfson School of Mechanical and Manufacturing Engineering, Loughborough University, Aug. 17, 2011, Loughborough, Leicestershire, LE11 3TU, UK, pp. 348-362.

Brotan et al., The hybrid manufacturing cell: Determining key parameters in the integration of powder bed fusion with high speed milling, Industrial Engineering and Engineering Management (IEEM), 2012 IEEE International Conference on Dec. 10-13, 2012, Hong Kong, pp. 583-587.

Brown et al., Thermal management issues and evaluation of a novel, flexible substrate, 3-dimensional (3-D) packaging concept, Multichip Modules and High Density Packaging, 1998 International Conference Apr. 15-17, 1998, Denver, CO, pp. 135-140.

Buckley et al., Application of Wet Electrostatic Precipitation Technology in the Utility Industry for Multiple Pollutant Control Including Mercury, Croll-Reynolds Clean Air Technologies, 2003, pp. 1-14.

Buekens, Electrostatic Precipitators, Pollution Control Technologies, Encyclopedia of Life Support Systems (EOLSS), vol. 1, 2008, pp. 1-9.

Building Energy Efficiency Frontiers and Incubator Technologies Benefit--2014, Funding Opportunity Announcement (FOA) No. DE-FOA-0001027, 2014, pp. 1-94.

Dukhan et al., An improved PCM Heat Storage Technology Utilizing Metal Foam, 2010 12.sup.th IEEE Intersociety Conference on Thermal and Thermomechanical Phenomena in Electronic Systems, (ITherm), Las Vegas, NV, Jun. 2-5, 2010, pp. 1-7.

Energy Star Emerging Technology Award Requirements: Advanced Dryers, Feb. 9, 2012, p. 1. Retrieved from Internet URL: https://www.energystar.gov/sites/default/files/asset/document/2012_ENERGY-_STAR_Emerging_Technology_Award_Advanced_Clothes_Dryers_Requirements.pdf.

Energy Star, Residential Clothes Dryers, Energy Star Market & Industry Scoping Report: Dryers, Nov. 2011, pp. 1-18.

Goswami et al., Analysis of Thermal Energy Storage in Cylindrical PCM Capsules Embedded in a Metal Matrix, Energy Conversion Engineering Conference 1990, IECEC-90 Proceedings of the 25$^{th}$ Inersociety, vol. 4, Aug. 12-17, 1990, pp. 257-262.

Green et al., Dynamic Thermal management of high heat flux devices using embedded solid-liquid phase change materials and solid state coolers, Thermal and Thermomechanical Phenomena in Electronic Systems, 13th IEEE Intersociety Conference on May 30, 2012-Jun. 1, 2012, pp. 853-862.

Gulli et al., Variable Transpiration Cooling for the Thermal Management of Reusable Hypersonic Vehicles, Aerospace Science and Technology. Elsevier, vol. 29, 2013, pp. 434-444.

Gurijanov, Ajax: New Directions in Hypersonic Technology, American Institute of Aeronautics and Astronautics, Inc., AIAA Paper 96-4609, 1996, pp. 9.

Hara et al., Optimization for Chip Stack in 3-D Packaging, Advanced Packaging, IEEE Transactions on, vol. 28, Issue 3, Aug. 2005, pp. 367-376.

Lee, Ventless Drying—The New Standard of Efficiency, Jul. 30, 2010, pp. 1-2.

Miles et al., Plasma-Enhanced Hypersonic Performance Enabled by MHD Power Extraction, AIAA 2005-0561, 43$^{rd}$ AIAA Aerospace Sciences Meeting and Exhibit, Reno Nevada, Jan. 10-13, 2005, 16 Pages.

(56) References Cited

OTHER PUBLICATIONS

Mochizuki et al., A Review of Heat Pipe Application Including New Opportunities, Frontiers in Heat Pipes, Global Digital Central, vol. 2, 013001, 2011, 15 Pages.

Pingsheng et al., Effect of Charge on Growth of Droplets with Ionic Condensation Nuclei, Chinese Science Bulletin, vol. 56, No. 18, Jun. 2011, pp. 1942-1946.

Radiant Heating With Infrared—A Technical Guide to Understanding and Applying Infrared Heaters, Watlow Electric Manufacturing Company, 1997, pp. 1-39.

Rawal et al., Thermal management for multifunctional structures, Advanced Packaging, IEEE Transactions, vol. 22, Issue: 3, Denver, CO., Aug. 1999, pp. 379-383.

Reznikov et al., Corona discharge in the steam for electrostatically enforced condensation, Proceedings 2012 Electrostatics Joint Conference, Jun. 2012, pp. 1-4.

Reznikov et al., Electrohydrodynamic Enforcement of Evaporation and Gas Flow, IEEE Transactions on Industry Applications, vol. 47, No. 2, Mar./Apr. 2011, pp. 1036-1042.

Robak, Latent Heat Thermal Energy Storage with Embedded Heat Pipes for Concentrating Solar Power Applications, University of Connecticut Master's Theses, Paper 229. Obtained from: https://opencommons.uconn.edu/gs_theses/229/.

Salazar et al., Electrospray as an Enforcement of Steam Condensation, Proc. ESA Annual Meeting on Electrostatics, 2013, pp. 1-10.

Sharfi, Engineers guide to military aerospace and avionics, an Interview with General Micro Systems' Ceo Ben Sharfi, Extension Media, Application Solutions, 2014, 44 Pages.

Subracks, Enclosure Frames, Pixux Technologies.

Tapuchi et al., Obtaining Fresh Water from Atmosphere using Electrostatic Precipitation: Theory, Efficiency and Limitations, E-Water, Official Publication of the European Water Association (EWA), 2010, pp. 1-6.

Vanwie et al., Hypersonic Airbreathing Propulsion, John Hopkins APL Technical Digest, vol. 26, No. 4, 2005, pp. 430-437.

Wang et al., Numerical Investigation on the Optimization of Local Transpiration Cooling Effectiveness, Applied Thermal Engineering, ScienceDirect, vol. 127, 2017, pp. 58-69.

Wu et al., Investigation of the Polymer Wick Structure Applied to Loop Heat Pipe, 2009 4th International Microsystems, Packaging, Assembly and Circuits Technology Conference, Oct. 21-23, 2009, pp. 368-371.

Yang, Corona-Driven Air Propulsion for Cooling of Microelectronics, Master of Science in Electrical Engineering, 2002, pp. 1-81.

Yogev et al., PCM Storage System with Integrated Active Heat Pipe, Energy Procedia, Proceedings of the Solar Paces 2013 International Conference, ScienceDirect, vol. 49, 2014, pp. 1061-1070.

Zukowski, Experimental Study of Short Term Thermal Energy Storage Unit Based on Enclosed Phase Change Material in Polyethylene Film Bag, Energy Conversion and Management, vol. 48, Issue 1, Jan. 2007, pp. 166-173.

\* cited by examiner

SYSTEM AND METHOD FOR COOLING A LEADING EDGE OF A HIGH SPEED VEHICLE

FIELD

The present subject matter relates generally to leading edge technologies for use in high speed vehicles, such as hypersonic aircraft, and more particularly to dual-modal cooling systems for use with the leading edge of such high speed vehicles.

BACKGROUND

High speed vehicles often experience thermal management issues resulting from high heat load experienced during high speed operation, particularly at leading edges where the free air stream impinges on the vehicle. For example, in an application involving hypersonic aircrafts, the leading edges can include the nose, engine cowls, and the leading edges of wings and stabilizers. Particularly when these vehicles are operating in the hypersonic speed range (e.g., Mach 5 or greater), the leading edges may be subjected to very high heat load (e.g., 500-1500 W/cm$^2$) as the incident airflow passes through a bow shock and comes to rest at the vehicle surface, converting the kinetic energy of the gas to internal energy and greatly increasing its temperature. Unmitigated exposure to such thermal loading can result in component degradation and/or failure.

Improvements in materials and manufacturing techniques have enabled hypersonic aircraft to operate at higher speeds and temperatures. Additional advancements in vehicle speed and duration of high speed flight times can be achieved through improvement in the cooling ability and high temperature durability of the leading edges of high speed vehicles. Transpiration cooling involves passage of fluid to an ambient environment surrounding the leading edge to undergo transpiration. This technique requires an expendable cooling fluid. The cooling fluid, in addition to supporting hardware (e.g., storage tanks, piping, etc), adds weight to and consumes volume on the vehicle. Advancement in the art requires mitigation of these negative consequences associated with transpirational cooling.

Accordingly, improvements to leading edge technologies and methods of cooling leading edges or hypersonic vehicles would be particularly beneficial.

BRIEF DESCRIPTION

Aspects and advantages of the invention will be set forth in part in the following description, or may be obvious from the description, or may be learned through practice of the invention.

In one exemplary embodiment of the present disclosure, a leading edge assembly for a hypersonic vehicle, the leading edge assembly comprising: an outer wall that tapers to a leading edge, the outer wall comprising a porous region at the leading edge; a coolant supply in fluid communication with the porous region for selectively providing a flow of coolant through the porous region of the outer wall; and an internal fluid cooling assembly in thermal communication with the outer wall.

According to another exemplary embodiment, A method of operating a leading edge assembly of a hypersonic vehicle, the method comprising: operating the hypersonic vehicle in a first operation mode; cooling an outer wall of the leading edge assembly that tapers to a leading edge using an inner fluid cooling assembly of the leading edge assembly while operating the hypersonic vehicle in the first operation mode; operating the hypersonic vehicle in a second operation mode; and cooling a leading edge of the outer wall by providing a flow of coolant to a porous region of the outer wall located at the leading edge of the outer wall while operating the hypersonic vehicle in the second operation mode.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Repeat use of reference characters in the present specification and drawings is intended to represent the same or analogous features or elements of the present invention.

DETAILED DESCRIPTION

Reference now will be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

The word "exemplary" is used herein to mean "serving as an example, instance, or illustration." Any implementation described herein as "exemplary" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The singular forms "a," "an," and "the" include plural references unless the context clearly dictates otherwise. The terms "coupled," "fixed," "attached to," and the like refer to both direct coupling, fixing, or attaching, as well as indirect coupling, fixing, or attaching through one or more intermediate components or features, unless otherwise specified herein.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust. The terms "upstream" and "downstream" refer to the relative direction with respect to fluid flow in a fluid pathway. For example, "upstream" refers to the direction from which the fluid flows, and "downstream" refers to the direction to which the fluid flows.

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin. These approximating margins may apply to a single value, either or both endpoints defining numerical ranges, and/or the margin for ranges between endpoints.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

In general, aspects of the present subject matter are directed to leading edge assemblies for high speed aircraft or vehicles, such as hypersonic aircraft. As used herein, the term "hypersonic" refers generally to air speeds above Mach 5. However, it should be appreciated that aspects of the present subject matter are not limited only to hypersonic flight, but may instead apply to applications involving other high speed vehicles, projectiles, objects, etc, with flight Mach numbers of less than 5. The description of leading edge assemblies herein with respect to use on a hypersonic aircraft are only examples intended to facilitate the explanation of aspects of the present subject matter. The present subject matter is not limited to such exemplary embodiments and applications. In fact, in embodiments described herein, it is possible for the same aircraft to fly at hypersonic, supersonic, and/or subsonic speeds.

Figure 1:
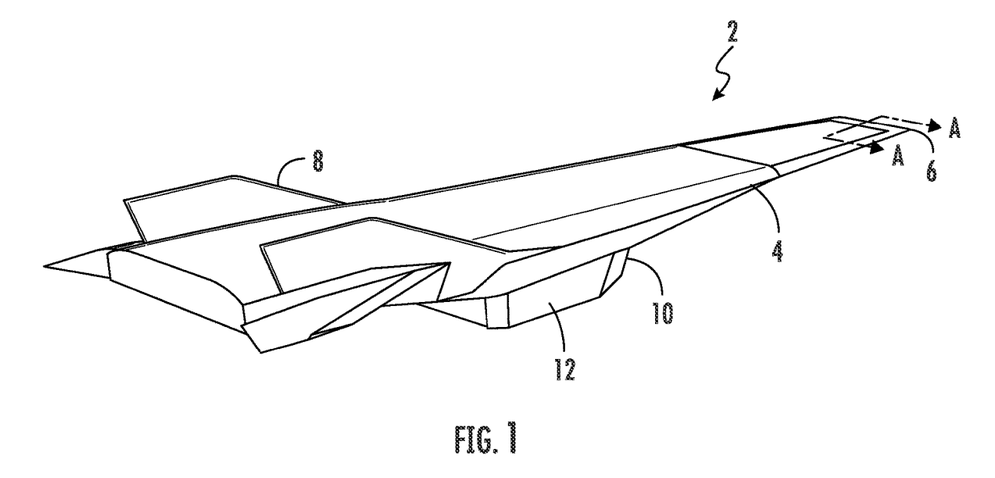
FIG. 1 is a perspective view of a hypersonic vehicle in accordance with an exemplary embodiment of the present disclosure.

Referring to FIG. 1, high speed vehicles, such as a hypersonic aircraft 2, typically experience extremely high temperatures and thermal gradients during high speed or hypersonic operation. The temperature gradients that are caused by the high heat flux are often a more severe problem than the temperature itself. For example, the thermal conductivity of the structural material, in combination with the heat flux, sets the temperature gradient within the material, and at high heat loads this gradient leads to mechanical stresses that cause plastic deformation or fracture of the material. The heat load to the structural material should be reduced to maintain the structural integrity of the components.

As will be appreciated, the leading edges of such high speed vehicles often experience the highest thermal loading. For example, a hypersonic vehicle may include a plurality of leading edge assemblies (e.g., identified generally herein by reference numeral 100) which experience high thermal loads during hypersonic flight. In this regard, leading edge assemblies 100 may be provided on a forward end of the aircraft wings 4, the nose cone 6, the vertical stabilizer 8, the engine cowls 10 of the propulsion engines 12, or other leading edges or surfaces of the hypersonic aircraft 2. According to exemplary embodiments of the present subject matter, leading edge assemblies 100 include features for mitigating the effects of such thermal loading, e.g., by carrying heat out of the region.

Notably, it is typically desirable to make leading edge assemblies 100 as sharp or pointed as possible, e.g., in order to reduce drag on the hypersonic vehicle. However, referring now to FIG. 1, when leading edge assemblies 100 are formed into a sharp point, extremely high temperatures and thermal gradients are experienced within leading edge assembly 100 at its forward or leading edge, also referred to herein as a stagnation line, a stagnation point 102, or similar terms. In this regard, as a hypersonic vehicle is traveling through air at hypersonic speeds, a free stream flow of air (e.g., identified herein by reference numeral 104) passes over and around leading edge assembly 100, thereby generating large thermal loads. Aspects of the present subject matter are directed to thermal management technologies and features for cooling leading edge assemblies 100, with a particular focus on the regions close to stagnation point 102, where the most serious thermal management issues typically arise.

It should be appreciated that the leading edge assemblies 100 illustrated herein are simplified cross section illustrations of exemplary leading edges described above. The size, configuration, geometry, and application of such leading edge technologies may vary while remaining within the scope of the present subject matter. For example, the leading edge assemblies 100 described herein define a radius of between about 1 mm and 3 mm. However, according to alternative embodiments, leading edge assemblies could have any other suitable diameter.

The cooling technologies and thermal management features are described herein as being used to cool portions of one or more parts of a hypersonic aircraft, such as the leading edges of the wings, nose, propulsion engines, or other parts of the hypersonic aircraft that experience large temperature gradients. However, it should be appreciated that aspects of the present subject matter may be used to manage thermal loading such as high temperatures and thermal gradients within any component and in any suitable application. In this regard, for example, aspects of the present subject matter may apply to any other hypersonic vehicle or to any other technology or system having components that are exposed to high temperatures and/or large temperature gradients.

In addition, although various techniques, component configurations, and systems are described herein for cooling leading edge assemblies 100 of a hypersonic vehicle, it should be appreciated that variations and modifications may be made to such technologies without departing from the scope of the present subject matter. In addition, one or more such technologies may be used in combination with each other to achieve improved cooling and thermal management. In this regard, although each cooling technology is described in isolation in order to clearly describe how each technology functions, the embodiments described are only examples intended for the purpose of illustration and explanation, and are not intended to limit the scope of the present subject matter in any manner.

In addition, according to exemplary embodiments of the present subject matter, some or all components described herein may be formed using an additive-manufacturing process, such as a 3-D printing process. The use of such a process may allow certain components of a hypersonic vehicle, such as leading edge assemblies 100, to be formed integrally, as a single monolithic component, or as any suitable number of sub-components. As used herein, the terms "additively manufactured" or "additive manufacturing techniques or processes" refer generally to manufacturing processes wherein successive layers of material(s) are provided on each other to "build-up," layer-by-layer, a three-dimensional component. The successive layers generally fuse together to form a monolithic component which may have a variety of integral sub-components.

Although additive manufacturing technology is described herein as enabling fabrication of complex objects by building objects point-by-point, layer-by-layer, typically in a vertical direction, other methods of fabrication are possible and within the scope of the present subject matter. For example, although the discussion herein refers to the addition of material to form successive layers, one skilled in the art will appreciate that the methods and structures disclosed herein may be practiced with any additive manufacturing technique or manufacturing technology. For example, embodiments of the present invention may use layer-additive processes, layer-subtractive processes, or hybrid processes.

Suitable additive manufacturing techniques in accordance with the present disclosure include, for example, Fused Deposition Modeling (FDM), Selective Laser Sintering (SLS), 3D printing such as by inkjets, laser jets, and binder jets, Sterolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes.

The additive manufacturing processes described herein may be used for forming components using any suitable material. For example, the material may be metal, concrete, ceramic, epoxy, or any other suitable material that may be in solid, liquid, powder, sheet material, wire, or any other suitable form or combinations thereof. More specifically, according to exemplary embodiments of the present subject matter, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, and nickel or cobalt based superalloys (e.g., those available under the name Inconel® available from Special Metals Corporation). These materials are examples of materials suitable for use in the additive manufacturing processes described herein, and may be generally referred to as "additive materials."

In addition, the additive manufacturing process disclosed herein allows a single component to be formed from multiple materials. Thus, the components described herein may be formed from any suitable mixtures of the above materials. For example, a component may include multiple layers, segments, or parts that are formed using different materials, processes, and/or on different additive manufacturing machines. In this manner, components may be constructed which have different materials and material properties for meeting the demands of any particular application. In addition, although the components described herein are constructed entirely by additive manufacturing processes, it should be appreciated that in alternate embodiments, all or a portion of these components may be formed via casting, machining, and/or any other suitable manufacturing process. Indeed, any suitable combination of materials and manufacturing methods may be used to form these components.

Figure 2:
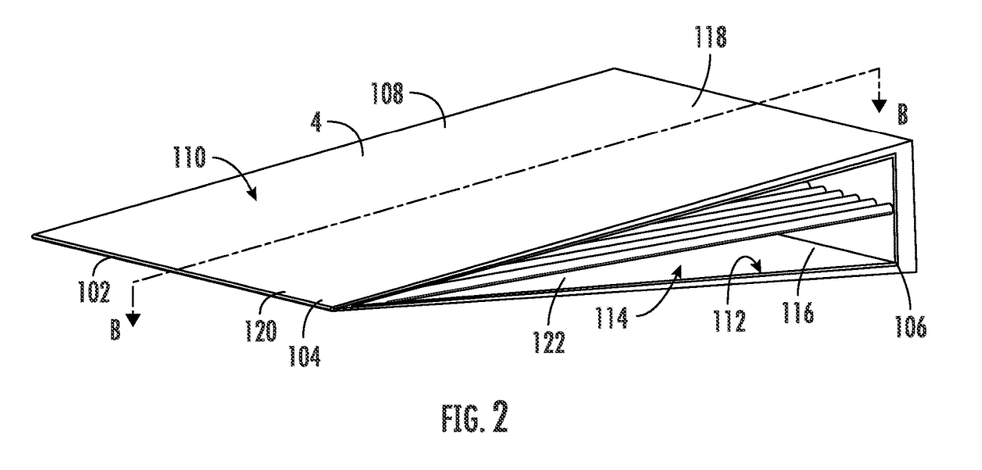
FIG. 2 is a close-up, cross-sectional, schematic view of a leading edge assembly of a hypersonic vehicle in accordance with an exemplary embodiment of the present disclosure, as seen along Line A-A in FIG. 1.

Referring to FIG. 2, leading edge assembly 100 will be described in more detail according to an exemplary embodiment of the present subject matter. Specifically, FIG. 2 provides a cross-sectional view of a leading edge assembly 100 of the aircraft nose 6 as seen along Line A-A in FIG. 1. However, it should be understood that the leading edge assembly 100 may be positioned at a leading edge (e.g., a forward end, a leading end, upstream end, etc.) of any component of a hypersonic aircraft. For example, leading edge assembly 100 may be, e.g., a leading edge of an inlet duct to a hypersonic propulsion engine, a leading edge of a turbine engine, a leading edge of a wing(let) of the aircraft, a forward end of a vertical stabilizer, etc.

As explained herein, large thermal loads may be experienced by leading edge assemblies 100 during hypersonic flight operations. As used herein, the terms "thermal load" and the like are intended generally to refer to the high temperatures, temperature gradients, or heat flux experienced within a component of a hypersonic or high-speed vehicle. According to exemplary embodiments of the present subject matter, leading edge assemblies 100 are formed or provided with thermal regulation features or technologies for managing these thermal loads.

For example, as described in more detail below with reference to FIG. 2, leading edge assembly 100 may include one or more features for providing or distributing a material within the leading edge assembly 100 to move thermal energy from one or more relatively hot locations, e.g., proximate stagnation point 102, to relatively cold regions, e.g., downstream of the stagnation point 102. In this manner, the temperature gradient experienced within leading edge assembly 100 may be reduced. It should be appreciated that the thermal regulation features and technologies described herein for each exemplary leading edge assembly 100 may be used alone or in combination with any other leading edge technologies described herein to regulate the thermal loading on one or more leading edge assemblies 100 of a hypersonic vehicle, or any other surface of any other component that experiences high thermal loading.

The stagnation point 102 may define a forward end 104 of the leading edge assembly 100. The leading edge assembly 100 may further include an aft end 106. The stagnation point 102 may define the leading edge of the nose 6 depicted in FIG. 1. The leading edge assembly 100 can include an outer wall 108. As explained above, outer wall 108 and other components of leading edge assembly 100 may be formed from any suitable material. According to an exemplary embodiment, such materials are selected to withstand the high thermal loading experienced by the leading edges of a hypersonic aircraft. For example, outer wall 108 may be constructed from at least one of aluminum, titanium, titanium aluminide, tungsten, tungsten alloy, nickel superalloy, refractory material, high entropy refractory alloy, single-crystal metal, ceramic, ceramic matrix composite (CMC), or carbon-carbon composite. Nevertheless, it may still be desirable in certain applications to provide additional cooling capacity for thermal management of the high heat loads experienced by leading edge assembly 100. Moreover, as explained above, the additive manufacturing technologies may be used to print leading edge assembly 100 (e.g. including outer wall 108) as a single monolithic component, and may facilitate improved cooling technologies and leading edge features. Leading edge assembly 100 may also be formed from sintering in a high temperature furnace or spark plasma sintering.

As is shown in the embodiment depicted, the outer wall 108 is generally formed from a continuous wall section. In other embodiments, the outer wall 108 can be formed from a first wall section and a second wall section that meet or join, for example, at the stagnation point 102. The surfaces of the outer wall 108 may be angled relative to each other such that leading edge assembly 100 is tapered from an aft end of leading edge assembly 100 to the forward end 104 of leading edge assembly 100 (e.g., which corresponds to stagnation point 102). In other words, leading edge assembly 100 is wider or taller proximate aft end of leading edge assembly 100 and narrows as it approaches stagnation point 102. Notably, the taper angle may vary depending on aerodynamic and other considerations while remaining within the scope of the present subject matter.

As described above, for the embodiment shown, the outer wall 108 generally forms a leading edge portion of the outer wall 108, and defines at least part of an outer surface 110 of the leading edge assembly 100 and an inner surface 112 of the leading edge assembly 100. It should be understood that the outer and inner surfaces 110 and 112 can be spaced apart from one another by a single-layered outer wall 108 or an outer wall including multiple discrete components, stratum, or the like. The outer wall 108 may generally define a cavity, or vapor chamber 114, that is enclosed and defined by the inner surface 112. Thus, according to the exemplary embodiment, the vapor chamber 114 may be an enclosed, constant volume chamber or reservoir. According to an embodiment, the vapor chamber 114 may be filled or charged with a working fluid 116 which is used to transfer thermal energy within leading edge assembly 100. In addition, outer wall 108 may be hermetically sealed or include impermeable walls. When leading edge assembly 100 is constructed as described herein, it may generally operate as a heat pipe, or a type of heat exchanger that may be used to transfer thermal energy through the evaporation and condensation of the working fluid 116, as described in more detail below.

Working fluid 116 can generally be any fluid or gas that circulates within vapor chamber 114 to allow for transfer of thermal energy from relatively hot regions of the leading edge assembly 100 (e.g., proximate stagnation point 102) to relatively cool regions of the leading edge assembly 100 (e.g., regions downstream from stagnation point 102). Working fluid 116 should generally be selected such that it is compatible with leading edge assembly 100 and is suitable for the desired operating range. For example, according to exemplary embodiments, working fluid 116 may include at least one of water, steam, acetone, methanol, ethanol, toluene, etc. According to still other embodiments, the working fluid 116 can be a liquid metal. The working fluid 116 may include one or more of lithium, sodium, silver, etc. As described in more detail below, working fluid 116 may be configured to evaporate from a liquid state to a gaseous state to absorb thermal energy and condense from the gaseous state back to the liquid state to discharge the thermal energy into cooler regions or surfaces of the leading edge assembly 100.

According to the illustrated embodiment, vapor chamber 114 generally extends between a condenser section 118 at one end of vapor chamber 114 and an evaporator section 120 at an opposite end of vapor chamber 114. Specifically, as illustrated, evaporator section 120 is positioned proximate forward end 104 of leading edge assembly 100, e.g., proximate stagnation point 102, where the temperature and heat flux are typically the highest. By contrast, condenser section 118 may generally be positioned proximate aft end 106 of leading edge assembly 100, where temperatures are relatively low compared to the stagnation point 102.

During operation, the working fluid 116 contained within the vapor chamber 114 of leading edge assembly 100 absorbs thermal energy at the evaporator section 120, e.g., at stagnation point 102. The working fluid 116 fluid may evaporate and travel in a gaseous state from the evaporator section 120 to the condenser section 118. At the condenser section 118, the gaseous working fluid 116 condenses to a liquid state and thereby releases thermal energy. The working fluid 116 may then flow in liquid form back to the evaporator section 120, e.g., by capillary flow as described below. In this manner, vapor chamber 114 and working fluid 116 generally operate as a heat pipe, transferring thermal energy from portions of leading edge assembly 100 experiencing the highest heat load toward regions of leading edge assembly 100 which experience relatively low heat load. After the heat is transferred to the aft surfaces (e.g., proximate condenser section 118), that heat can be rejected from the leading edge assembly 100 in the form of thermal radiation.

It should be appreciated that the terms "liquid" and "vapor" are used herein generally to refer to the phases or states of working fluid 116 as it passes within vapor chamber 114. However, it should be appreciated that the present subject matter does not require that all working fluid 116 be a liquid, and vice versa, that all working fluid 116 be a vapor. Depending on the current operating conditions of leading edge assembly 100, working fluid 116 may be in any suitable state without departing from the scope of the present subject matter.

The leading edge assembly 100 may further include a capillary structure 122 that is positioned within vapor chamber 114 for circulating working fluid 116. Specifically, as illustrated, capillary structure 122 can be positioned on the inner surface 112 of outer wall 108 within vapor chamber 114. In this regard, capillary structure 122 may line or cover all or part of the perimeter of inner surface 112 for transporting condensed working fluid 116 toward the stagnation point 102 of the leading edge assembly 100.

The capillary structure 122 may generally be any component, feature, material, or structure configured for to transporting liquid working fluid 116 from the condenser section 118 to the evaporator section 120 by capillary flow or forces. For example, capillary structure 122 may be a porous or mesh membrane. Alternatively, capillary structure 122 may be an array of capillary tubes, an offset wall, a porous structure, a wick, a screen, a honeycomb structure, or any other structure configured for urging a flow of liquid working fluid 116 toward evaporator section 120. In a particular embodiment, the capillary structure 122 includes a micro-porous structure or a micro-grooved structure that lines the inner surface 112 of the outer wall 108.

Figure 3:
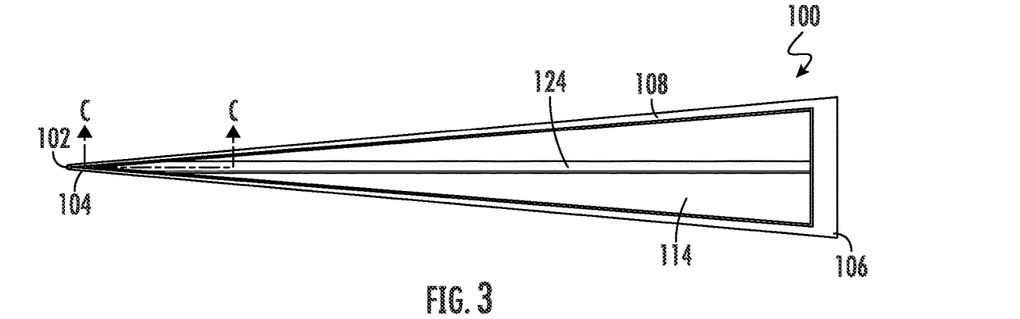
FIG. 3 is a cross-sectional, schematic view of a leading edge assembly of a hypersonic vehicle in accordance with an exemplary embodiment of the present disclosure, as seen along Line B-B in FIG. 2.

FIG. 3 illustrates a cross-sectional view of a portion of the leading edge assembly 100 as seen along Line B-B in FIG. 2. A channel 124 can extend through the vapor chamber 114, such as between the forward end 104 and the aft end 106. In the illustrated embodiment, the channel 124 extends through a central portion of the vapor chamber 114, approximately equally spaced apart from opposing outer walls 108. The channel 124 can include a passageway 128 (FIG. 6) for a coolant supply (described in greater detail hereinafter) to be provided to the leading edge. Notably, the coolant supply may be different from the working fluid 116. For example, the coolant supply and working fluid 116 can include different material compositions, can include different operating conditions, can be fluidly isolated from one another, and the like. In a particular embodiment, the working fluid 116 can define a cooling fluid loop fluidly isolated from the coolant supply and configured to provide secondary cooling functionality.

Figure 4:
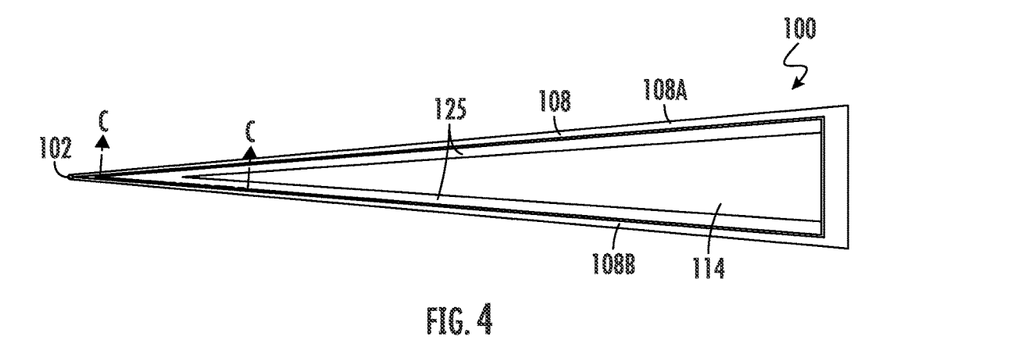
FIG. 4 is a cross-sectional, schematic view of a leading edge assembly of a hypersonic vehicle in accordance with another exemplary embodiment of the present disclosure, as seen along Line B-B in FIG. 2.

FIG. 4 illustrates a cross-sectional view of a portion of the leading edge assembly 100 as seen along Line B-B in FIG. 2 in accordance with another embodiment. Instead of the channel 124 extending through a central portion of the vapor chamber 114 as depicted in FIG. 3, the embodiment illustrated in FIG. 4 includes channels 125 extending along, e.g., adjacent to, the outer walls 108 of the vapor chamber 114. More specifically, the channels 125 are disposed along upper and lower outer wall segments 108A and 108B. Similar to channels 124, the channels 125 illustrated in FIG. 4 can include one or more passageways 128 (FIG. 6) for the coolant supply to be provided to the leading edge. In certain instances, only one of the outer wall segments 108A or 108B includes channel(s) 125.

Figure 5:
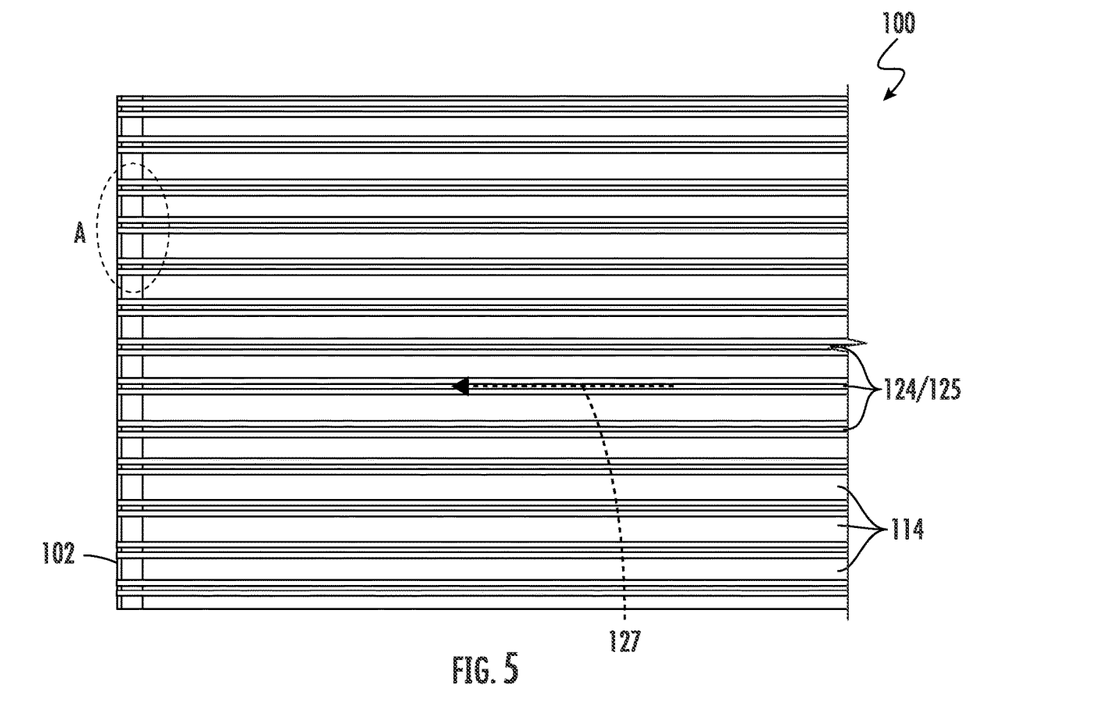
FIG. 5 is a cross-sectional view of a portion of the leading edge assembly in accordance with an exemplary embodiment of the present disclosure, as seen along Line C-C in FIG. 3 or along Line C-C in FIG. 4.

FIG. 5 illustrates a cross-sectional view of a portion of the leading edge assembly 100 as seen along Line C-C in FIG. 3 or along Line C-C in FIG. 4. In the embodiment illustrated in FIG. 3, the channel 124 is centrally disposed within the vapor chamber 114. In the embodiment illustrated in FIG. 4, the channel 125 is disposed along the walls of the vapor chamber 114. Regardless of the disposition of the channels 124 or 125 relative to the vapor chamber 114, in some embodiments the cross-sectional views as seen along Lines C-C may be the same as one another. It should be understood that in other embodiments, cross-sectional shapes of the channels 124 and 125 may be different from one another to, e.g., enhance fluid circulation based on localized characteristics impacted by the location of the channel.

As illustrated, the channel 124 and/or 125 can include a plurality of channels 124. The plurality of channels 124 can be arranged in a row, extending along a length of the leading edge in a direction, parallel (or generally parallel) with the leading edge. In an embodiment, each channel 124 can define a passageway 128 (FIG. 6) for coolant supply to be provided to the leading edge. Coolant can enter each channel 124 and travel along direction 127 towards the leading edge. In an embodiment, portions of the vapor chamber 114 can occupy space between adjacent channels 124. That is, for example, the channels 124 can be spaced apart from one another by the vapor chamber 114 which can be filled with vapor or internal cooling fluid described herein.

Figure 6:
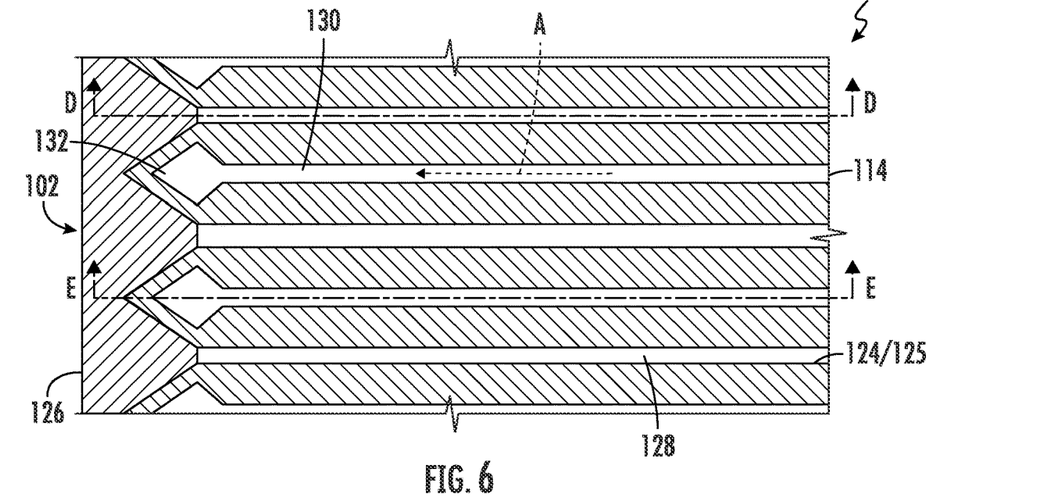
FIG. 6 is a close-up view of a portion of the leading edge assembly in accordance with an exemplary embodiment of the present disclosure, as seen in Circle A in FIG. 5.

FIG. 6 illustrates a close-up view of a portion of the leading edge assembly 100 as seen in Circle A in FIG. 5 in accordance with an embodiment. Referring to FIG. 6, the leading edge assembly 100 may be configured as a porous leading edge portion, identified herein as porous tip 126, at the stagnation point 102.

According to an exemplary embodiment, the leading edge assembly 100, or more specifically porous tip 126, may define a constant porosity. As used herein, the term "porosity" may be used generally to refer to a measure of the void or empty spaces within a material or structure. Thus, a structure having porosity has open passages, cells, fine holes, or structures through which fluidly may flow from one porous cell to another. For example, porosity may be used to refer to a fraction of the volume of voids or open space over a total volume of a component. According to exemplary embodiments, the porosity of porous tip 126 may be greater than about 5%, 10%, 20%, 40% or greater than even 50%. In addition, or alternatively, the porosity of porous tip 126 may be less than about 80% 60%, 40%, 20%, or 5%. It should be appreciated that the porosity of porous tip 126 may vary depending on the application while remaining within scope of the present subject matter. For example, the porosity may vary based on the mass flow rate of the coolant, the mechanical properties of porous tip 126, based on anticipated flight conditions, or based on any other suitable parameters. In other embodiments, porous tip 126 may define a variable porosity, e.g., in order to concentrate a cooling coolant at prescribed regions. In a particular embodiment, the porous tip 126 may define a progressively varying porosity, i.e., such that the porosity continuously and progressively increases, e.g., from a lowest porosity to a highest porosity.

According to an exemplary embodiment, the leading edge assembly 100 is configured to provide a flow of coolant supply to the porous tip 126 such that the coolant supply may seep through the porous tip 126 and cool the leading edge assembly 100 at the stagnation point 102 during high-temperature operation. To accommodate passage of the coolant supply, the channels 124 and/or 125 can include passageways 128 in fluid communication with the porous tip 126. The passageways 128 can have fixed and/or variable geometries and sizes as compared to each other or even at different points along the length of a single passageway.

As described above, the channels 124 and/or 125 may be used to transport the coolant supply to the leading edge of the leading edge assembly 100. The channels 124 and/or 125 can be described as a first cooling system. In accordance with one or more embodiments described herein, the leading edge assembly 100 can further include a secondary cooling system configured to enhance heat removal from the leading edge. The leading edge assembly 100 may thus have a dual-modal cooling structure. The secondary cooling system can generally include use of an internal fluid cooling assembly such as a vapor chamber 114 and/or an internal cooling circuit, described in greater detail below.

FIG. 6 illustrates an embodiment of the leading edge assembly 100 utilizing an internal cooling circuit as a secondary cooling system. The internal cooling circuit of the exemplary embodiment includes an internal cooling flow of working fluid 116 through a passageway 130 in a direction indicated by arrow A impinging on a front face 132 of the passageway 130. The working fluid 116 transports heat from the leading edge, thereby providing a secondary cooling system for removing heat from the leading edge.

Figure 7:
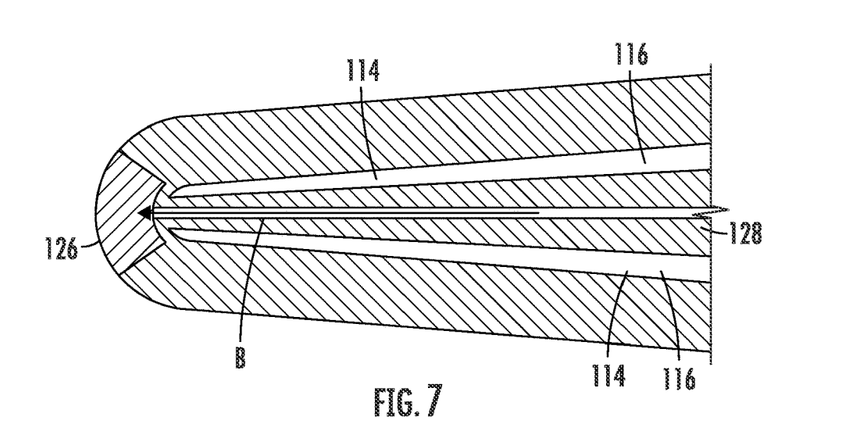
FIG. 7 is a close-up, cross-sectional, schematic view of a portion of the leading edge assembly in accordance with an exemplary embodiment of the present disclosure, as seen along Line D-D in FIG. 6.
Figure 8:
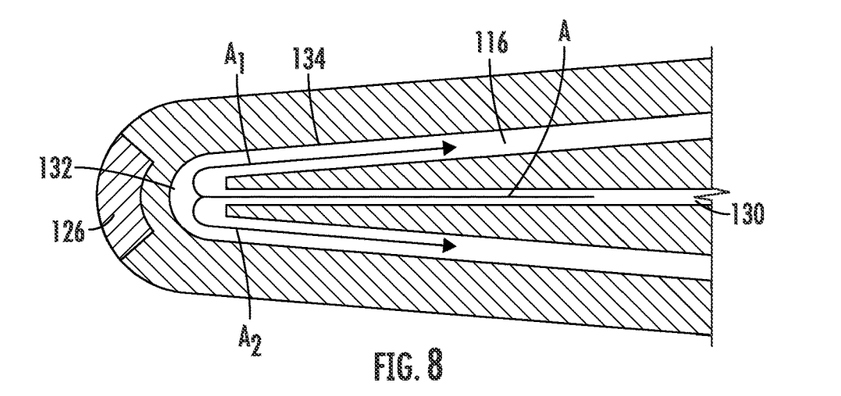
FIG. 8 is a close-up, cross-sectional, schematic view of a portion of the leading edge assembly in accordance with an exemplary embodiment of the present disclosure, as seen along Line E-E in FIG. 6.

FIGS. 7 and 8 illustrate show enlarged, cross-sectional views of the leading edge assembly 100, and more particularly of the internal cooling circuit shown in FIG. 6. FIG. 7 illustrates the internal cooling circuit as seen along Line D-D in FIG. 6. FIG. 8 illustrates the internal cooling circuit as seen along line E-E in FIG. 6.

Referring initially to FIG. 7, which illustrates a cross-sectional view through the passageway 128 of one of the channels 124 or 125 of the first cooling system, the coolant supply can flow through the passageway 128 to the porous tip 126 in a direction indicated by arrow B. Meanwhile, the working fluid 116 can be disposed within the vapor chamber 114 and circulate so as to remove heat from the leading edge.

FIG. 8 illustrates a cross-sectional view through the passageway 130 of the secondary cooling system. In the illustrated embodiment, the passageway 130 receives a flow of the working fluid 116 along a flowpath shown by arrow A. The working fluid 116 can be biased in the direction shown by arrow A. For example, the working fluid 116 can be pressurized, e.g., by a pump, and directed into passageway 130. The working fluid 116 can reach the front face 132 of the passageway 130 and circulate through one or more auxiliary passageways 134 with fluid flow pointed in a direction generally away from the leading edge. Specifically, the one or more auxiliary passageways 134 can define work fluid 116 flow paths in a direction shown by arrows $A_1$ and $A_2$. In such a manner, the secondary cooling system can actively cool the leading.

Figure 9:
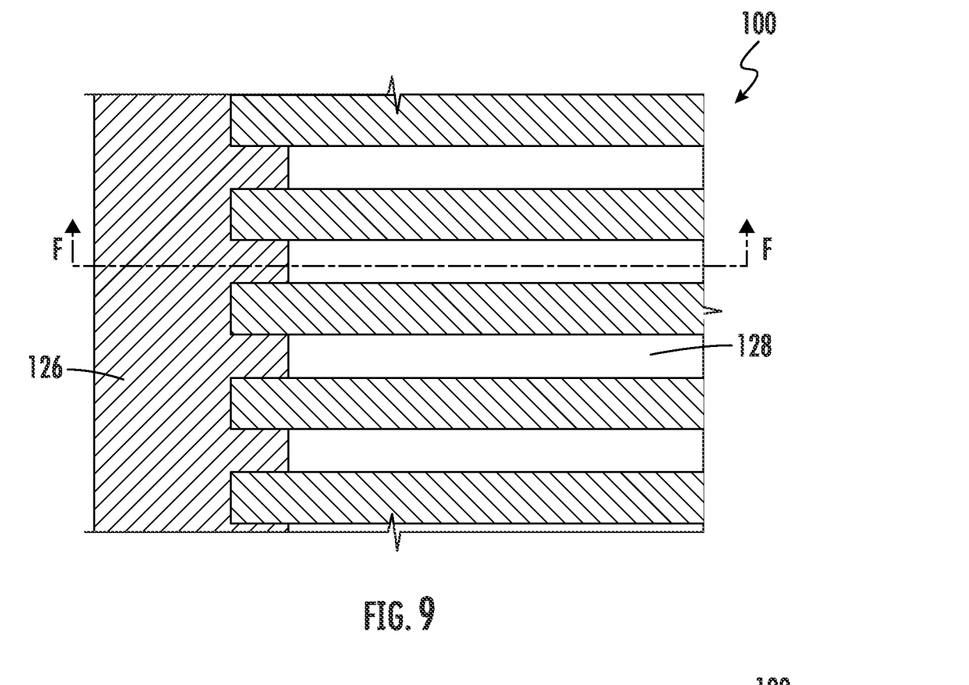
FIG. 9 is a close-up view of a portion of the leading edge assembly in accordance with an exemplary embodiment of the present disclosure, as seen in Circle A in FIG. 5.
Figure 10:
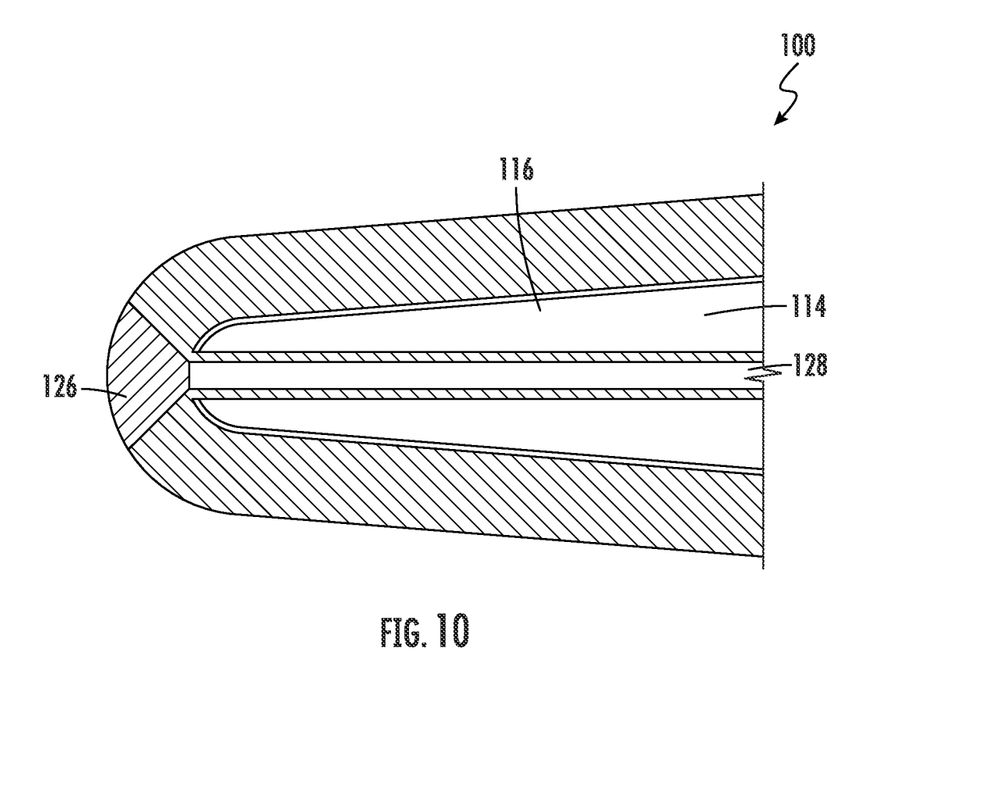
FIG. 10 is a close-up, cross-sectional, schematic view of a portion of the leading edge assembly in accordance with an exemplary embodiment of the present disclosure, as seen along Line F-F in FIG. 9.

FIG. 9 illustrates a close-up view of a portion of the leading edge assembly 100 as seen in Circle A in FIG. 5 in accordance with another embodiment. The first cooling system includes passageways 128 in fluid communication with porous tip 126 and configured to transport coolant thereto. Adjacent passageways 128 are not spaced apart by passageways 130 of the secondary cooling system as seen in the embodiment illustrated, e.g., in FIG. 6. FIG. 10 illustrates a cross-sectional cut through the passageway 128 of the first cooling system. The working fluid 116 can be disposed within the vapor chamber 114 and circulate so as to remove heat from the leading edge.

Figure 11:
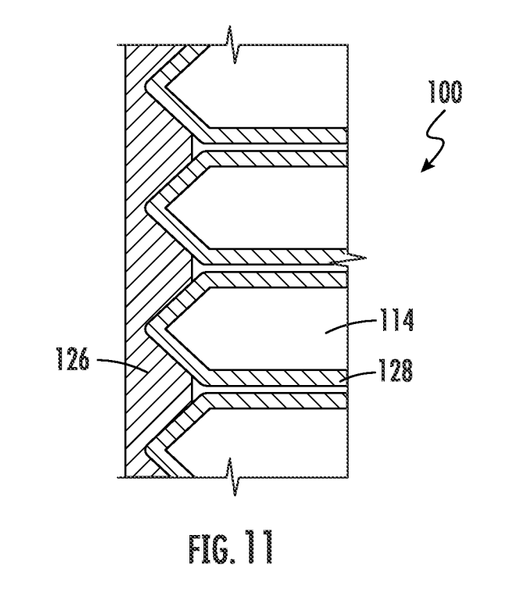
FIG. 11 is a close-up view of a portion of the leading edge assembly in accordance with an exemplary embodiment of the present disclosure, as seen in Circle A in FIG. 5.

FIG. 11 illustrates a close-up view of a portion of the leading edge assembly 100 as seen in Circle A in FIG. 5 in accordance with yet another embodiment. As illustrated, adjacent passageways 128 extending to the porous tip 126 are spaced apart from one another by the vapor chamber 114.

Figure 12:
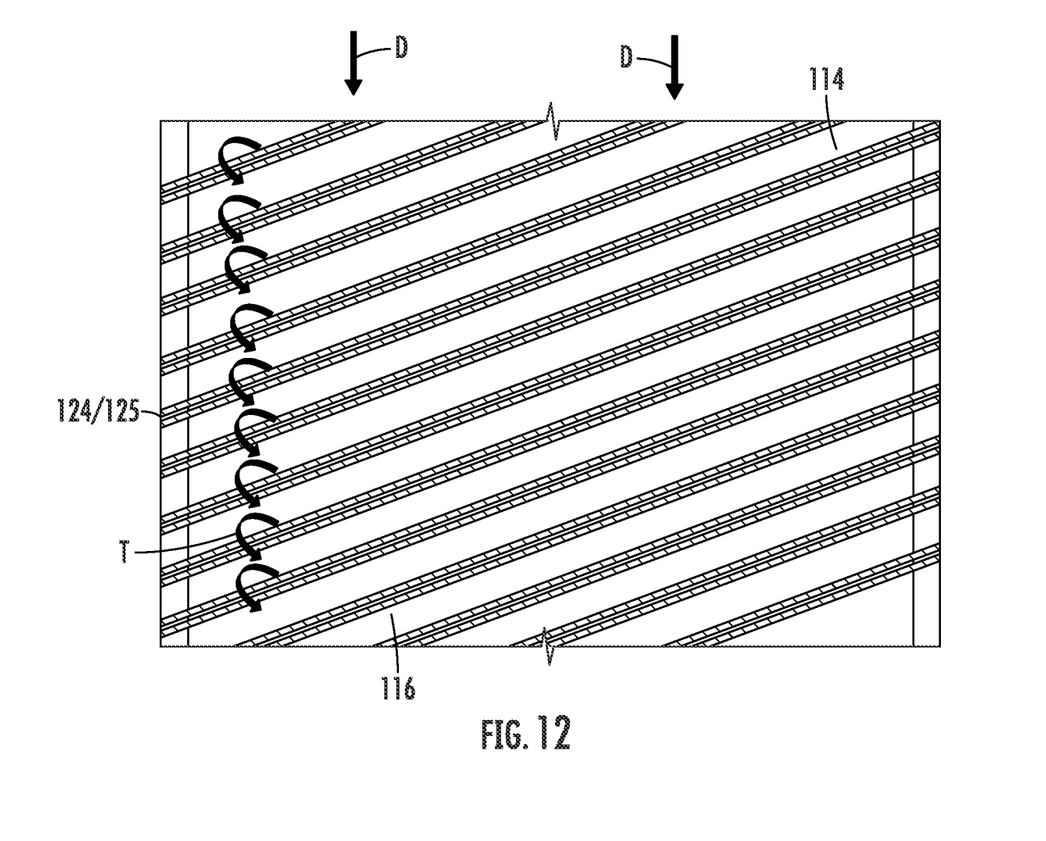
FIG. 12 is a cross-sectional view of a portion of the leading edge assembly in accordance with an exemplary embodiment of the present disclosure, as seen along Line C-C in FIG. 3 or along Line C-C in FIG. 4.

FIG. 12 illustrates a cross-sectional view of a portion of the leading edge assembly 100 as seen along Line C-C in FIG. 3 or along Line C-C in FIG. 4 in accordance with another embodiment. In an embodiment, the channels 124 and/or 125 can be angularly offset from normal relative to the leading edge. That is, for instance, while the channels 124 and/or 125 illustrated in FIG. 5 extend perpendicular to a line parallel with the leading edge, the channels 124 and/or 125 (and passageways 128) illustrated in FIG. 12 are angularly offset from being perpendicular with the line parallel with the leading edge. That is, the passageway 128 can be canted relative to a best fit line of the leading edge. By way of example, the channels 124 and/or 125 can be angularly offset from being perpendicular with the line parallel with the leading edge by at least 1°, such as at least 5°, such as at least 15°, such as at least 30°, such as at least 40°. Angled channels 124 and/or 125 can act as turbulators T for the working fluid 116 as it passes over the angled channels 124 and/or 125 in a direction generally indicated by arrows D. This may be particularly pronounced when the channels 124 and/or 125 are disposed along the outer wall 108 like shown in FIG. 4. By turbulating the working fluid 116, yet further enhanced cooling may be achieved.

Figure 13:
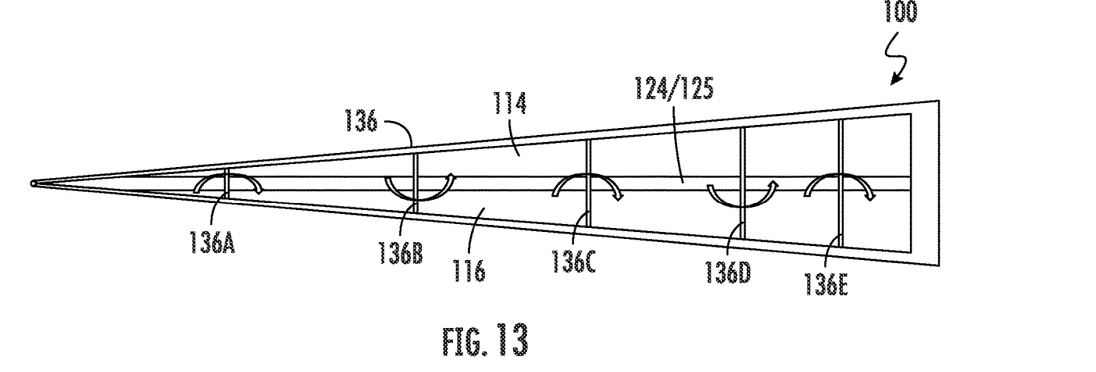
FIG. 13 is a cross-sectional, schematic view of a leading edge assembly of a hypersonic vehicle in accordance with an exemplary embodiment of the present disclosure, as seen along Line B-B in FIG. 2.

FIG. 13 illustrates a cross-sectional view of a portion of the leading edge assembly 100 as seen along Line B-B in FIG. 2 in accordance with yet another embodiment. In the illustrated embodiment, the leading edge assembly 100 further includes one or more walls 136 disposed within the vapor chamber 114. The one or more walls 136 may guide working fluid 116 through the vapor chamber 114. For instance, in the illustrated embodiment, the one or more walls 136 include a first wall 136A, a second wall 136B, a third wall 136C, a fourth wall 136D, and a fifth wall 136E all disposed within the vapor chamber 114. The one or more walls 136 can extend less than the total distance of the vapor chamber so as to create a winding, continuous cooling circuit 138 through the vapor chamber 114. For example, the working fluid can flow in a direction into the page between the fourth and fifth walls 136D and 136E, flow in a direction out of the page between the third and fourth walls 136C and 136D, flow in a direction into the page between the second and third walls 136B and 136C, and flow in a direction out of the page between the first and second walls 136A and 136B. The above pattern is exemplary only and can include any number of different wall arrangements, geometries, sizes, flow patterns, and the like. Moreover, the one or more walls 136 can be utilized with channels 125 extending adjacent to the outer wall 108.

Figure 14:
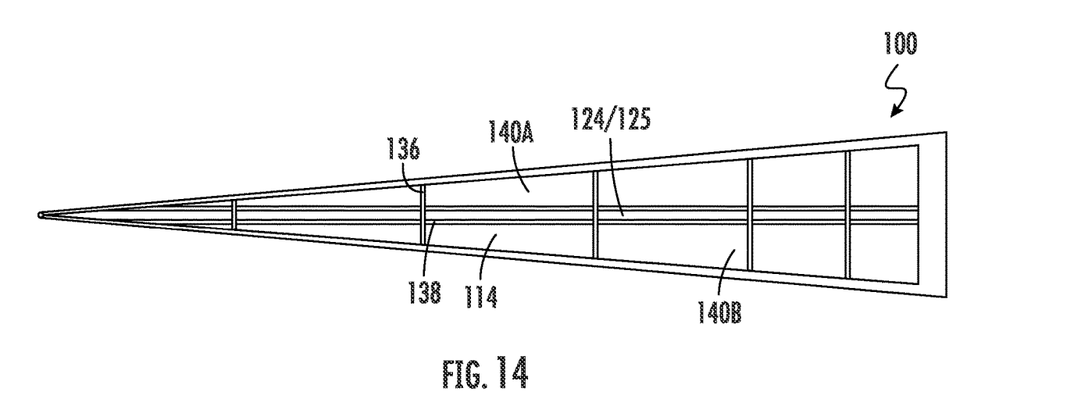
FIG. 14 is a cross-sectional, schematic view of a leading edge assembly of a hypersonic vehicle in accordance with an exemplary embodiment of the present disclosure, as seen along Line B-B in FIG. 2.

FIG. 14 illustrates a cross-sectional view of a portion of the leading edge assembly 100 as seen along Line B-B in FIG. 2 in accordance with yet another embodiment. Similar to the embodiment illustrated in FIG. 13, the embodiment of the leading edge assembly 100 seen in FIG. 14 includes one or more walls 136 extending through the vapor chamber. However, unlike the embodiment illustrated in FIG. 13, the embodiment of the leading edge assembly 100 seen in FIG. 14 further includes a divider 138 to separate the vapor chamber 114 into a first portion 140A and a second portion 140B. The first and second portions 140A and 140B may correspond to first and second halves of the vapor chamber 114. In a particular embodiment, the divider 138 can be disposed adjacent to the channel 124 and/or 125. The divider 138 can include a single divider or a plurality of dividing elements operating together to form the divider 138.

By way of non-limiting example, the divider 138 can divide the vapor chamber 114 into an upper half and a lower half. In certain instances, the upper and lower halves of the vapor chamber 114 can be fluidly isolated from one another. In other instances, the upper and lower halves of the vapor chamber 114 can be in fluid communication, e.g., so as to form one continuous cooling circuit for the secondary cooling system. The cooling circuit can take any number of routes through the vapor chamber 114. For example, the cooling circuit can take a generally serpentine pattern through the vapor chamber 114.

Figure 15:
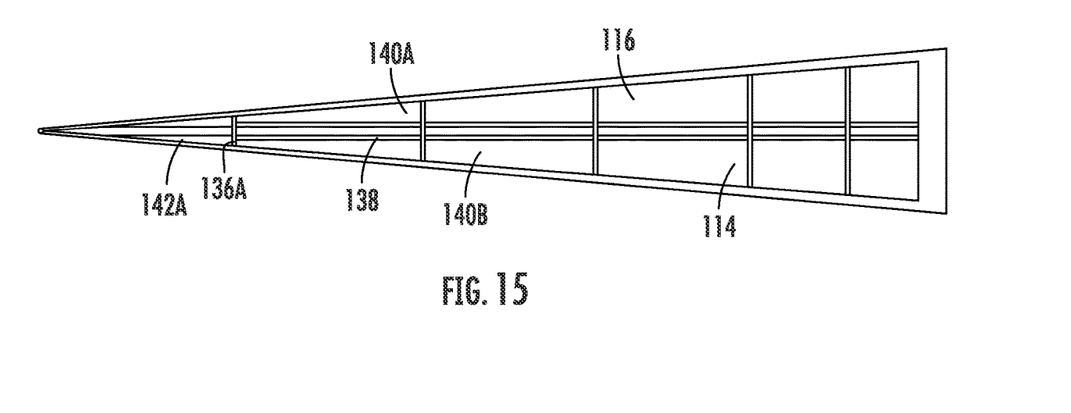
FIG. 15 is a cross-sectional, schematic view of a leading edge assembly of a hypersonic vehicle in accordance with an exemplary embodiment of the present disclosure, as seen along Line B-B in FIG. 2.

FIG. 15 illustrates a cross-sectional view of a portion of the leading edge assembly 100 as seen along Line B-B in FIG. 2 in accordance with yet another embodiment. In the illustrated embodiment, the divider 138 separates the vapor chamber 114 into first and second portions, however, a first volume 142A defined by the first wall 136A does not include the divider 138. Working fluid 116 is thus free to move between the first and second portions 140A and 140B, particularly at the leading edge.

In certain embodiments described herein, the working fluid 116 can be used for internal cooling while the coolant is transported to the porous tip 126 for transpiration in the surrounding environment. Use of dual-modal cooling arrangements such as the exemplary model described above in leading edge assemblies 100 may enhance thermal efficiency as compared to unimodal cooling arrangements. More particularly, the use of simultaneous cooling systems at the leading edge may increase cooling performance. Moreover, redundancies offered using a dual-modal cooling arrangement may avoid overheating during momentary changes in thermal loading conditions. In certain instances, the transpiration of coolant may be particularly suitable at extremely high heat loads, e.g., at hypersonic speeds, while use of the working fluid within the secondary cooling system may be more suitable to cool the leading edge at lower speeds, e.g., sub-hypersonic speeds.

Although exemplary thermal enhancement features are illustrated herein, it should be appreciated that any other suitable thermal enhancement features may be used while remaining within the scope of the present subject matter. In addition, or alternatively, the outer wall 106 may include any suitable number, type, geometry, and configuration of surface aberrations, protrusions, fins, or other suitable features for increasing the rate of thermal transfer. Moreover, although such thermal enhancement features are illustrated on in certain positions, it should be appreciated that such features may also be used on other surfaces of the leading edge assembly 100.

In addition, it should be appreciated that the relative volume of vapor chamber 114 may vary while remaining within the scope of the present subject matter.

Thus, aspects of the present subject matter disclosed above present an improved leading edge assembly 100 and methods of forming the same for cooling regions of hypersonic aircraft that experience extremely high thermal loading. Features described herein may be additively manufactured as a single, integral, and monolithic piece. In addition, the additive manufacturing methods described herein facilitate the formation of leading edge assembly 100 using any suitable material or materials and enable the formation of extremely intricate heat exchange features with high surface area for improved thermal contact between materials. In addition, the use of a working fluid 116 can include circulating thermal energy from hotter regions to cooler regions of leading edge assembly 100.

Figure 16:
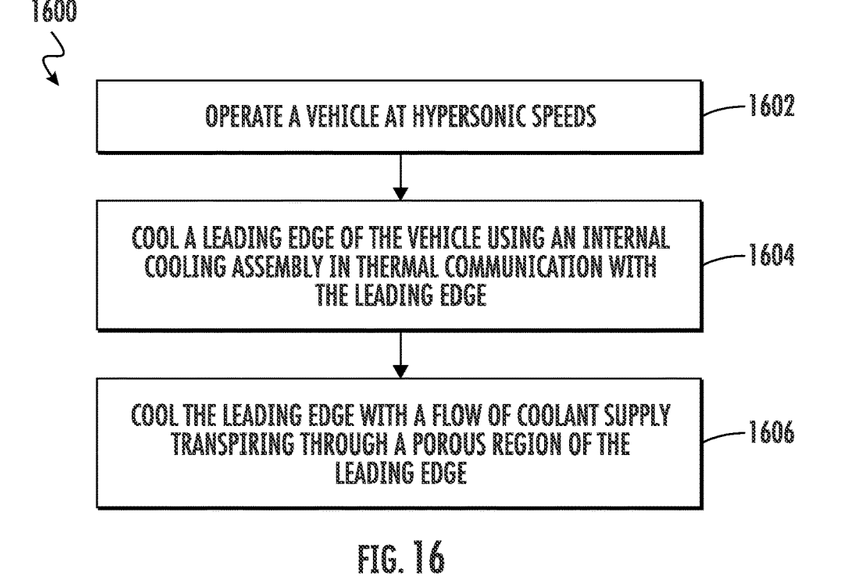
FIG. 16 is a flow chart of a method of cooling a vehicle operating at hypersonic speeds in accordance with an exemplary embodiment of the present disclosure.

FIG. 16 illustrates a flow chart of an exemplary method 1600 of cooling a vehicle operating at hypersonic speeds. The method 1600 can include a step 1602 of operating the vehicle at hypersonic speeds. The method 1600 can further include a step 1604 of cooling a leading edge of the vehicle using an internal cooling assembly in thermal communication with the leading edge. The method 1600 can further include a step 1606 of cooling the leading edge with a flow of coolant supply transpiring through a porous region of the leading edge. The steps 1604 and 1606 can be performed using different fluids. For instance, the step 1604 of cooling the leading edge using an internal cooling assembly can be performed with a working fluid, such as working fluid 116 previously described while the step 1606 of cooling the leading edge using a coolant can be performed using the coolant previously described. In an embodiment, the steps 1604 and 1606 can be performed simultaneously. In other embodiments, the steps 1604 and/or 1606 can be performed without simultaneously performing the actions in the other of steps 1604 and 1606.

Figure 17:
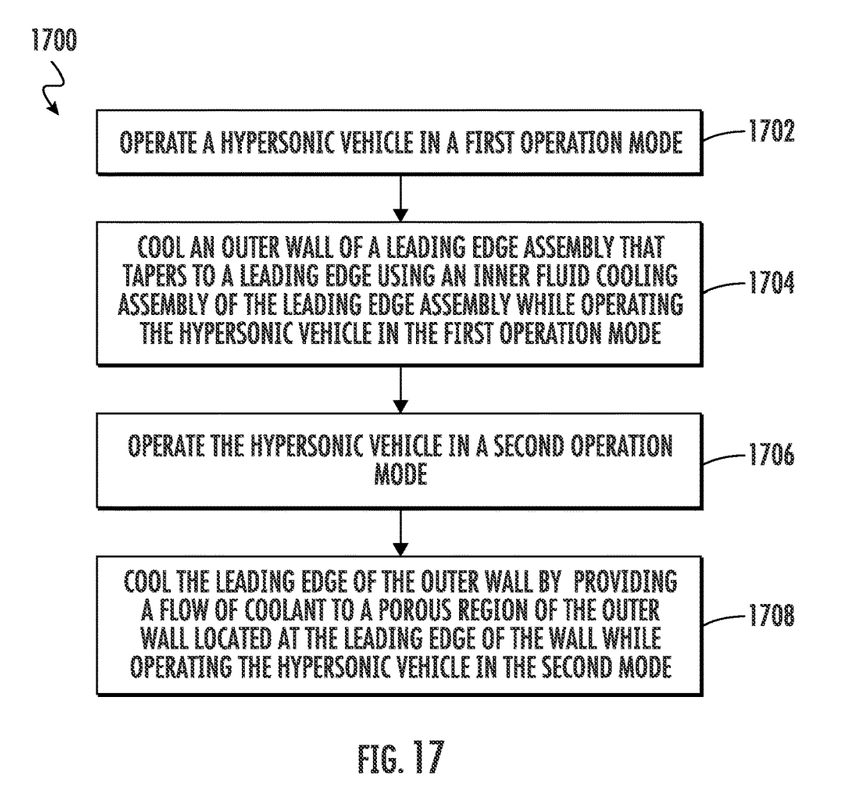
FIG. 17 is a flow chart of a method of operating a leading edge assembly of a hypersonic vehicle in accordance with an exemplary embodiment of the present disclosure.

FIG. 17 illustrates a flow chart of an exemplary method 1700 of operating a leading edge assembly of a hypersonic vehicle. The method 1700 includes a step 1702 of operating the hypersonic vehicle in a first operation mode. In an embodiment, the first operation mode is a first flight speed operation mode. In a more particular embodiment, the first operation mode is a relatively low hypersonic flight speed operation mode. The operation mode may also include reference to an altitude or air composition. For instance, the first operation mode can relate to a first altitude operation mode associated with a first altitude and the second operation mode can relate to a second altitude operation mode associated with a second altitude. By way of example, the first altitude can be lower than the second altitude. Thus, the hypersonic vehicle can operate in different modes based on non-speed related characteristics, e.g., altitude. The method 1700 can further include a step 1704 of cooling an outer wall of the leading edge assembly that tapers to a leading edge using an inner fluid cooling assembly of the leading edge assembly while operating the hypersonic vehicle in the first operation mode. The method 1700 can further include a step 1706 of operating the hypersonic vehicle in a second operation mode. The second operation mode can correspond with a second flight speed operation mode higher than the first flight speed operation. In an embodiment, the second flight speed operation can correspond with a hypersonic flight speed operation mode. The method 1700 can further include a step 1708 including cooling the leading edge of the outer wall by providing a flow of coolant to a porous region of the outer wall located at the leading edge of the wall while operating the hypersonic vehicle in the second mode. In an embodiment, cooling the outer wall of the leading edge assembly during hypersonic travel can include using the inner fluid cooling assembly.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

Further aspects of the invention are provided by the subject matter of the following clauses:

Embodiment 1. A leading edge assembly for a hypersonic vehicle, the leading edge assembly comprising: an outer wall that tapers to a leading edge, the outer wall comprising a porous region at the leading edge; a coolant supply in fluid communication with the porous region for selectively providing a flow of coolant through the porous region of the outer wall; and an internal fluid cooling assembly in thermal communication with the outer wall.

Embodiment 2. The leading edge assembly of any one of the embodiments, wherein the internal fluid cooling assembly is in thermal communication with the leading edge of the outer wall.

Embodiment 3. The leading edge assembly of any one of the embodiments, wherein the leading edge assembly further comprises a passageway extending between a forward end of the leading edge assembly and an aft end of the leading edge assembly, and wherein the coolant supply is configured to flow through the passageway to the porous region.

Embodiment 4. The leading edge assembly of any one of the embodiments, wherein the internal fluid cooling assembly comprises a vapor chamber housing a working fluid.

Embodiment 5. The leading edge assembly of any one of the embodiments, wherein the vapor chamber comprises one or more walls configured to generate one continuous cooling circuit through the vapor chamber.

Embodiment 6. The leading edge assembly of any one of the embodiments, wherein the working fluid is fluidly isolated from the coolant supply.

Embodiment 7. The leading edge assembly of any one of the embodiments, wherein the leading edge assembly is configured to transport the coolant supply to an external environment through the porous region.

Embodiment 8. The leading edge assembly of any one of the embodiments, wherein the internal fluid cooling assembly comprises a cooling fluid loop fluidly isolated from the coolant supply.

Embodiment 9. The leading edge assembly of any one of the embodiments, wherein the cooling fluid loop comprises a passageway configured to transport a working fluid of the internal fluid cooling assembly to the leading edge.

Embodiment 10. The leading edge assembly of any one of the embodiments, wherein the cooling fluid loop further comprises one or more auxiliary passageways configured to transport heated working fluid away from the leading edge.

Embodiment 11. The leading edge assembly of any one of the embodiments, wherein the leading edge assembly further comprises a barrier configured to separate the coolant supply into a first portion and a second portion.

Embodiment 12. The leading edge assembly of any one of the embodiments, wherein the coolant supply is transported to the leading edge through a passageway of the leading edge assembly, and wherein the passageway is canted relative to a best fit line of the leading edge.

Embodiment 13. The leading edge assembly of any one of the embodiments, wherein the coolant from the coolant supply comprises a liquid metal.

Embodiment 14. The leading edge assembly of any one of the embodiments, wherein the cooling fluid comprises lithium, sodium, silver, or a combination thereof.

Embodiment 15. The leading edge assembly of any one of the embodiments, wherein the outer wall is formed from a ceramic matrix composite or refractory material.

Embodiment 16. A method of operating a leading edge assembly of a hypersonic vehicle, the method comprising: operating the hypersonic vehicle in a first operation mode; cooling an outer wall of the leading edge assembly that tapers to a leading edge using an inner fluid cooling assembly of the leading edge assembly while operating the hypersonic vehicle in the first operation mode; operating the hypersonic vehicle in a second operation mode; and cooling a leading edge of the outer wall by providing a flow of coolant to a porous region of the outer wall located at the leading edge of the outer wall while operating the hypersonic vehicle in the second operation mode.

Embodiment 17. The method of any one of the embodiments, wherein the first operation mode is a first flight speed operation mode, wherein the second operation mode is a second flight speed operation mode, wherein the first flight speed operation mode is a lower speed operation mode than the second speed operation mode.

Embodiment 18. The method of any one of the embodiments, wherein the first operation mode is a first altitude operation mode associated with a first altitude, wherein the second operation mode is a second altitude operation mode associated with a second altitude, and wherein the first altitude is higher than the second altitude.

Embodiment 19. The method of any one of the embodiments, further comprising cooling the outer wall of the leading edge assembly using the inner fluid cooling assembly while operating the hypersonic vehicle in the second operation mode.

Embodiment 20. The method of any one of the embodiments, wherein the coolant comprises a liquid metal or gas.

What is claimed is:

1. A leading edge assembly for a hypersonic vehicle, the leading edge assembly comprising:
   an outer wall that tapers to a leading edge, the outer wall comprising a porous region at the leading edge;
   a coolant supply in fluid communication with the porous region for selectively providing a flow of coolant through the porous region of the outer wall; and
   an internal fluid cooling assembly in thermal communication with the outer wall,
   wherein the internal fluid cooling assembly comprises a vapor chamber housing a working fluid.

2. The leading edge assembly of claim 1, wherein the internal fluid cooling assembly is in thermal communication with the leading edge of the outer wall.

3. The leading edge assembly of claim 2, wherein the leading edge assembly further comprises a passageway extending between a forward end of the leading edge assembly and an aft end of the leading edge assembly, and wherein the coolant supply is configured to flow through the passageway to the porous region.

4. The leading edge assembly of claim 1, wherein the vapor chamber comprises one or more walls configured to generate one continuous cooling circuit through the vapor chamber.

5. The leading edge assembly of claim 1, wherein the working fluid is fluidly isolated from the coolant supply.

6. The leading edge assembly of claim 1, wherein the leading edge assembly is configured to transport the coolant supply to an external environment through the porous region.

7. The leading edge assembly of claim 1, wherein the internal fluid cooling assembly comprises a cooling fluid loop fluidly isolated from the coolant supply.

8. The leading edge assembly of claim 7, wherein the cooling fluid loop comprises a passageway configured to transport a working fluid of the internal fluid cooling assembly to the leading edge.

9. The leading edge assembly of claim 8, wherein the cooling fluid loop further comprises one or more auxiliary passageways configured to transport heated working fluid away from the leading edge.

10. The leading edge assembly of claim 1, wherein the leading edge assembly further comprises a barrier configured to separate the coolant supply into a first portion and a second portion.

11. The leading edge assembly of claim 1, wherein the coolant supply is transported to the leading edge through a passageway of the leading edge assembly, and wherein the passageway is canted relative to a best fit line of the leading edge.

12. The leading edge assembly of claim 1, wherein the coolant from the coolant supply comprises a liquid metal.

13. The leading edge assembly of claim 12, wherein the cooling fluid comprises lithium, sodium, silver, or a combination thereof.

14. The leading edge assembly of claim 1, wherein the outer wall is formed from a ceramic matrix composite or refractory material.

15. A method of operating a leading edge assembly of a hypersonic vehicle, the method comprising:
    operating the hypersonic vehicle in a first operation mode;
    cooling an outer wall of the leading edge assembly that tapers to a leading edge using an inner fluid cooling assembly of the leading edge assembly while operating the hypersonic vehicle in the first operation mode;
    operating the hypersonic vehicle in a second operation mode; and
    cooling a leading edge of the outer wall by providing a flow of coolant to a porous region of the outer wall located at the leading edge of the outer wall while operating the hypersonic vehicle in the second operation mode.

16. The method of claim 15, wherein the first operation mode is a first flight speed operation mode, wherein the second operation mode is a second flight speed operation mode, wherein the first flight speed operation mode is a lower speed operation mode than the second speed operation mode.

17. The method of claim 15, wherein the first operation mode is a first altitude operation mode associated with a first altitude, wherein the second operation mode is a second altitude operation mode associated with a second altitude, and wherein the first altitude is higher than the second altitude.

18. The method of claim 15, further comprising:
    cooling the outer wall of the leading edge assembly using the inner fluid cooling assembly while operating the hypersonic vehicle in the second operation mode.

19. The method of claim 15, wherein the coolant comprises a liquid metal or gas.

* * * * *